US012018657B2

United States Patent
Kofman et al.

(10) Patent No.: US 12,018,657 B2
(45) Date of Patent: Jun. 25, 2024

(54) TOOL FOR SUPPORTING INTERNAL ROTATABLE MEMBERS OF WIND TURBINE COMPONENTS DURING MAINTENANCE AND METHOD OF USING SAME

(71) Applicant: Vestas Wind Systems A/S, Aarhus N (DK)

(72) Inventors: Joris Kofman, Aalborg Øst (DK); Thomas Paw Buus, Ans By (DK)

(73) Assignee: Vestas Wind Systems A/S, Aarhus N. (DK)

( * ) Notice: Subject to any disclaimer, the term of this patent is extended or adjusted under 35 U.S.C. 154(b) by 162 days.

(21) Appl. No.: 17/779,771

(22) PCT Filed: Nov. 25, 2020

(86) PCT No.: PCT/DK2020/050334
§ 371 (c)(1),
(2) Date: May 25, 2022

(87) PCT Pub. No.: WO2021/121494
PCT Pub. Date: Jun. 24, 2021

(65) Prior Publication Data
US 2023/0037407 A1  Feb. 9, 2023

(30) Foreign Application Priority Data
Dec. 16, 2019  (DK) .......................... PA 2019 70778

(51) Int. Cl.
*F03D 80/50*  (2016.01)

(52) U.S. Cl.
CPC ........ *F03D 80/50* (2016.05); *F05B 2230/604* (2013.01); *F05B 2260/301* (2013.01); *Y02E 10/72* (2013.01)

(58) Field of Classification Search
CPC ............... F03D 80/50; F05B 2230/604; F05B 2260/301; F05B 2260/30; Y02E 10/72
See application file for complete search history.

(56) References Cited

U.S. PATENT DOCUMENTS 4,452,558 A * 6/1984 Muraguchi ............ F16M 11/14
                                              248/580
4,925,363 A * 5/1990 Brown .................. F04D 17/125
                                              415/129

(Continued)

FOREIGN PATENT DOCUMENTS

| CN | 106378639 A | 2/2017 |
| EP | 1617075 A1 | 1/2006 |

(Continued)

OTHER PUBLICATIONS

Danish Patent and Trademark Office Search and Examination Report in PA 201970778, Jun. 23, 2020.

(Continued)

*Primary Examiner* — Ryan J. Walters
(74) *Attorney, Agent, or Firm* — Wood Herron & Evans LLP

(57) ABSTRACT

A jacking tool (70, 162, 174) for a wind turbine component (60) having an outer housing (62) and an internal rotatable member (64) disposed in the outer housing (62) and rotatable about a rotational axis (66) is disclosed. The jacking tool (70, 162, 174) includes a support pin (74, 164, 176) having a proximal end and a distal end that includes a bearing (112). The support pin (74, 164, 176) is configured to be selectively movable relative to the outer housing (62). The bearing (112) is configured to contact the internal rotatable member (64) to support the internal rotatable member (64) relative to the outer housing (62), and to allow the internal rotatable member (64) to rotate within the outer (Continued)

housing (62) while being supported by the jacking tool (70, 162, 174).

26 Claims, 13 Drawing Sheets

(56) References Cited

U.S. PATENT DOCUMENTS

| | | | |
|---|---|---|---|
| 5,331,243 A | 7/1994 | Halbohm | |
| 9,032,599 B2 * | 5/2015 | Spanos | B25B 27/026 |
| | | | 29/252 |
| 9,057,360 B2 * | 6/2015 | Tobinaga | F03D 80/70 |
| 9,528,393 B2 * | 12/2016 | Huber | F04D 29/644 |
| 9,739,177 B2 * | 8/2017 | Schaefer | F01D 25/246 |
| 10,218,248 B2 * | 2/2019 | Edwards | B66F 3/24 |
| 2011/0138595 A1 * | 6/2011 | Shiraishi | F03D 80/50 |
| | | | 29/402.03 |
| 2012/0141292 A1 | 6/2012 | Signore et al. | |
| 2016/0052756 A1 * | 2/2016 | Yamasue | F16C 41/04 |
| | | | 254/93 R |

FOREIGN PATENT DOCUMENTS

| | | |
|---|---|---|
| EP | 1748182 A2 | 1/2007 |
| JP | S6154846 A | 3/1986 |
| WO | 2016191147 A1 | 12/2016 |

OTHER PUBLICATIONS

European Patent Office, International Search Report and Written Opinion in PCT Application No. PCT/DK2020/050334, Feb. 22, 2021.

* cited by examiner

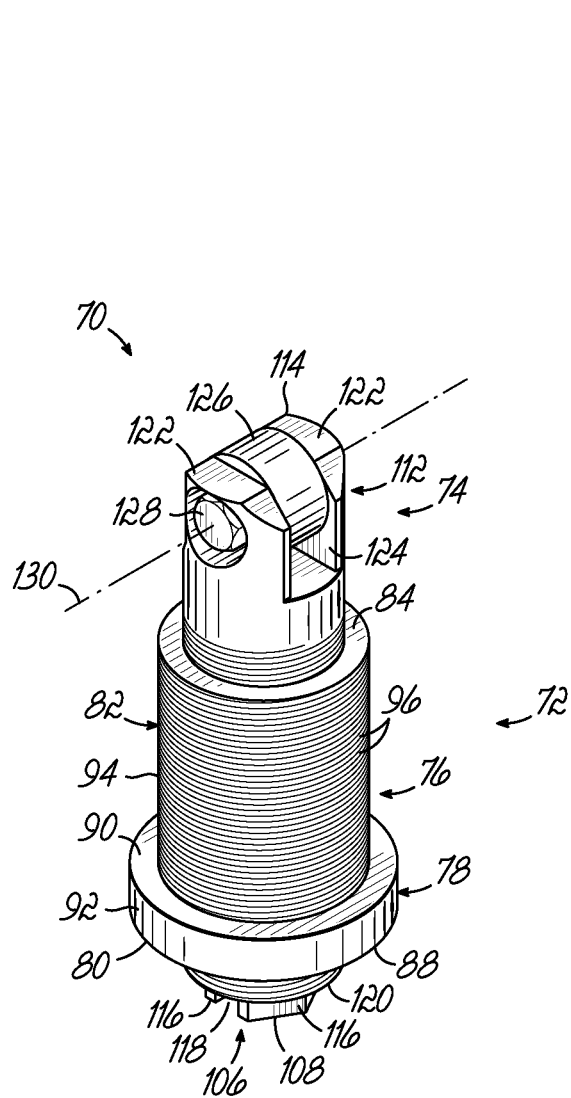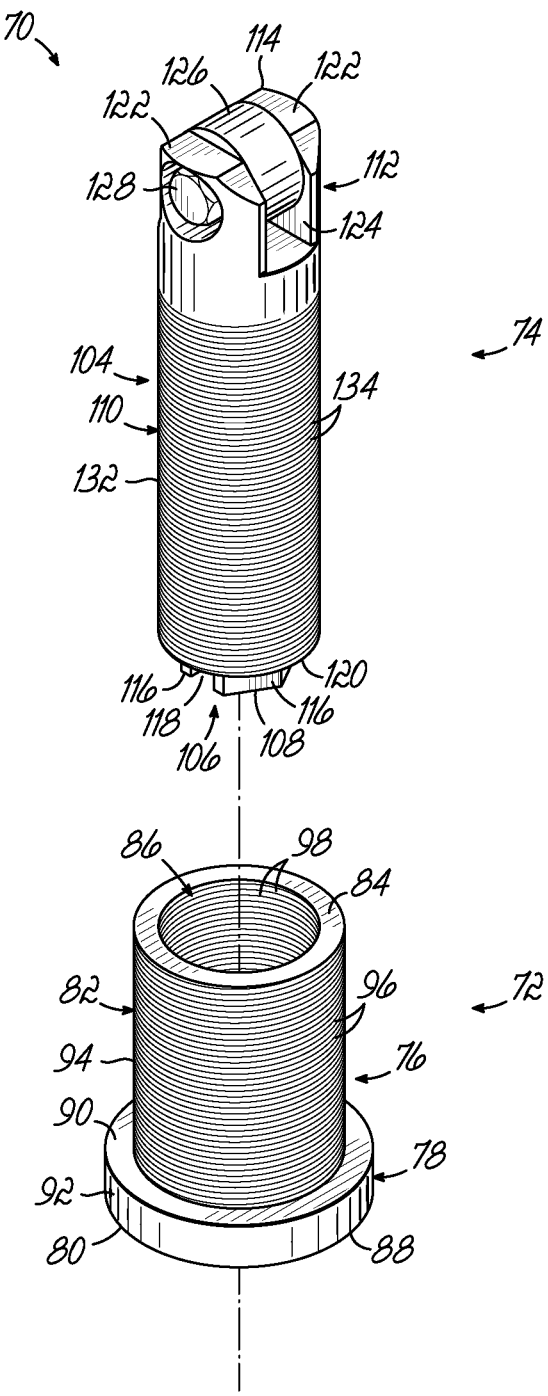
FIG. 7
FIG. 8

TOOL FOR SUPPORTING INTERNAL ROTATABLE MEMBERS OF WIND TURBINE COMPONENTS DURING MAINTENANCE AND METHOD OF USING SAME

TECHNICAL FIELD

The invention relates generally to wind turbines, and more particularly to a tool for supporting an internal rotatable member of a wind turbine component during a repair/replacement process, and to a method of using the tool during the repair/replacement process.

BACKGROUND

Wind turbines are used to produce electrical energy using a renewable resource and without combusting a fossil fuel. Generally, a wind turbine converts kinetic energy from the wind into electrical power. A conventional wind turbine installation includes a foundation, a tower supported by the foundation, and an energy generating unit positioned atop of the tower. The energy generating unit typically includes one or more nacelles to house several mechanical and electrical components, such as a generator, gearbox, and main bearing, and the wind turbine also includes a rotor operatively coupled to the components in the nacelle through a main shaft extending from the nacelle. Single rotor wind turbines and multi-rotor wind turbines (which may have multiple nacelles) are known, but for the sake of efficiency, the following description refers primarily to single rotor designs. The rotor, in turn, includes a central hub and a plurality of blades extending radially therefrom and configured to interact with the wind to cause rotation of the rotor. The rotor is supported on the main shaft, which is either directly or indirectly operatively coupled with the generator which is housed inside the nacelle. Consequently, as wind forces the blades to rotate, electrical energy is produced by the generator. Wind power has seen significant growth over the last few decades, with many wind turbine installations being located both on land and offshore.

As noted above, the nacelle houses several wind turbine components to convert kinetic energy from the wind and the rotor blades into electrical energy. Many of these components include a stationary frame or outer housing and one or more rotatable members disposed in the housing. By way of example, the main bearing support, gearbox, and generator all include an outer housing having one or more internal rotatable members disposed therein. During the lifetime of a wind turbine, it may be necessary or desirable to provide repair and/or replacement (collectively referred to as maintenance) to various wind turbine components in the nacelle. During maintenance of the wind turbine components, it may be important to maintain the position of the rotatable member relative to the outer housing in order to keep the rotational axis of the rotatable member aligned with adjacent components. For example, in gearbox maintenance, it may be important that the shafts associated with one or more gearbox stages remain in place during maintenance. This may be difficult due to the relatively high weight of the rotatable members and the general difficulty of adequately supporting heavy members when the rotational axis is horizontally oriented (and thus under the full effect of gravity).

During maintenance procedures, it may also be important that the rotatable member remain rotatable during the maintenance process. This may be necessary or desired in order to have the rotatable member or other related components couple/decouple from adjacent components to effectuate maintenance. By way of example, the sun pinion of a gearbox stage (e.g., the second gear stage of a gearbox) may have a helical configuration such that to disengage the sun pinion from an adjacent component (e.g., the first gearbox stage of the gearbox), the sun pinion (and its associated planet carrier) needs to be rotated to facilitate the disengagement.

Current methods for maintaining the position of an internal rotatable member (e.g., along a rotational axis) while also allowing rotation of the internal rotatable member typically includes removing the component from the nacelle and then orienting the component such that the rotational axis is generally aligned with the gravitational field (i.e., in a generally vertical orientation), to thereby obviate the high weight of the components prior to initiating the maintenance process. Due to the size and weight of the wind turbine components in the nacelle, current methods require a large crane or other lifting device to remove the components from the nacelle and properly orient the components on the ground, platform, deck, etc. for carrying out the maintenance process in a way that minimizes misalignment of the rotational axis. Such a process for repairing or replacing wind turbine components in the nacelle is costly and time consuming.

Thus, wind turbine manufacturers, installers and operators are seeking improved options for conducting maintenance on wind turbine components located in the nacelle in a more time-efficient and cost-effective manner. More particularly, there is a need for tools and methods that provide an in situ maintenance process for wind turbine components in the nacelle which maintain the position of an internal rotatable member relative to an outer housing, and allow for rotational movements of the rotatable member within the outer housing during the maintenance process.

SUMMARY

A jacking tool for a wind turbine component having an outer housing and an internal rotatable member disposed in the outer housing and rotatable about a rotational axis is disclosed. The jacking tool includes a support pin having a proximal end and a distal end that includes a bearing. The support pin is configured to be selectively movable relative to the outer housing. The bearing of the inner support pin is configured to contact the internal rotatable member to support the internal rotatable member relative to the outer housing, and to allow the internal rotatable member to rotate within the outer housing while being supported by the jacking tool.

In one embodiment, the jacking tool includes an outer bushing having a passageway extending through the outer bushing and configured to receive the support pin therein. The outer bushing is configured to be coupled to the outer housing. In an exemplary embodiment, the outer bushing includes a collar at a proximal end of the outer bushing and a shaft extending away from the collar and defining a distal end of the outer bushing. The outer bushing includes external threads for threadably coupling to the outer housing of the wind turbine component, such as at a port in the outer housing. For example, the external threads may extend along at least a portion of the length of the shaft of the inner support pin.

In one embodiment, the passageway of the outer bushing includes internal threads and the support pin includes external threads for threadably coupling the support pin to the outer bushing. Thus, the support pin is independently axially movable relative to the outer bushing. In one embodiment hereof, a pitch difference may be present between the external threads and the internal threads of the outer bushing. This will facilitate an axial movement between the support pin and the outer housing without also creating a rotational movement between the same. In an alternative embodiment, the support pin may rotatably float within the outer bushing but not be axially moveable relative to the outer bushing. The proximal end of the support pin may include a tool interface for coupling to a tool configured to rotate the support pin. In a further embodiment, the support pin may include a hydraulic actuator having a selectively extendable and retractable arm. The bearing may be positioned on the distal end of the arm for contacting the internal rotatable member. The hydraulic actuator may be coupled to a support stanchion on the outer housing.

The bearing at the distal end of the support pin may include a roller element that facilitates rotation of the internal rotatable member relative to the jacking tool. For example, in one embodiment the roller element may include a cylindrical roller, such as a wheel, capable of rotating relative to a rotational axis. In an alternative embodiment, the bearing may include a spherical ball which is capable of rotating in any direction. In a further embodiment, the bearing may include a spherical roller capable of rotating relative to a rotational axis and capable of accommodating various misalignments in the system.

In a further embodiment, a system includes a wind turbine component having an outer housing and an internal rotatable member disposed in the outer housing and rotatable about a rotational axis. The outer housing includes at least two ports configured to provide access to an interior of the outer housing adjacent the internal rotatable member. The system further includes a jacking system including at least two jacking tools. Each jacking tool is secured to the outer housing of the wind turbine component and selectively moveable to engage with the internal rotational member in the outer housing. The bearing of the support pin of the at least two jacking tools contacts the internal rotatable member to support the internal rotatable member relative to the outer housing, and to allow the internal rotatable member to rotate within the outer housing while being supported by the at least two jacking tools.

The at least two ports may be arranged in the outer housing such that the at least two jacking tools support the internal rotatable member along a lower portion thereof in order to support the weight of the internal rotatable member. Additionally, for elongate internal rotatable members, the at least two ports and the at least two jacking tools may be arranged in a first group of ports and jacking tools at a first longitudinal position on the internal rotatable member and a second group of ports and jacking tools at a second longitudinal position on the internal rotatable member. Each of the first and second groups of ports/jacking tools may generally be positioned in a plane (e.g., perpendicular to the longitudinal axis of the internal rotatable member).

In one embodiment, the wind turbine component used in combination with the jacking system includes a main bearing support. In another embodiment, the wind turbine component used in combination with the jacking system includes a gearbox or a portion of a gearbox, such as a gearbox stage. In a further embodiment, the wind turbine component used in combination with the jacking system includes a generator. Each of these are disposed within the nacelle of the wind turbine and the jacking system is configured to be used with the wind turbine components while remaining within the nacelle.

A method of performing maintenance on a wind turbine component is also disclosed. The wind turbine component includes an outer housing and an internal rotatable member disposed in the outer housing and rotatable about a rotational axis. The method includes providing at least two jacking tools, each jacking tool including a support pin configured to be selectively movable relative to the outer housing, and the support pin having a proximal end and a distal end that includes a bearing; securing the at least two jacking tools adjacent to respective ports in the outer housing of the wind turbine component; and moving the support pin of each jacking tool so that the bearing engages against the internal rotatable member disposed within the outer housing of the wind turbine component. The at least two jacking tools support the position of the internal rotatable member relative to the outer housing so as to maintain the position of the rotational axis during maintenance.

In one embodiment, securing the at least two jacking tools further includes threadably connecting each jacking tool to the respective ports in the outer housing. For example, the at least two jacking tools may further include an outer bushing configured to receive the support pin, wherein securing the at least two jacking tools further includes threadably connecting the outer bushing of each jacking tool to the respective ports in the outer housing. Additionally, the inner support pin may be threadably connected to the outer bushing and moving the support pin of each jacking tool may further include rotating the support pin of each jacking tool so that the bearing engages against the internal rotatable member. In one embodiment, the support pin may rotatably float within the outer bushing and wherein moving the support pin of each jacking tool may further include rotating the outer bushing of each jacking tool so that the bearing engages against the internal rotatable member.

In one embodiment, securing the at least two jacking tools may further include connecting each jacking tool to a respective support stanchion on the outer housing. Additionally, moving the support pin of each jacking tool may further include actuating a hydraulic actuator so that the bearing engages against the internal rotatable member.

In accordance with one particular aspect of the invention, the method may further include rotating the internal rotatable member while being supported by the at least two jacking tools. This may be achieved through the bearing at the distal end of the jacking tools. In one embodiment, the bearing includes a roller, such as a cylindrical or spherical roller, rotatable about a rotational axis, and the method may further include orienting the bearing relative to the internal rotatable member so that the rotational axis of the roller is generally parallel to the rotational axis of the internal rotatable member. In order to provide the desired orientation of the bearing relative to the internal rotatable member, the method may further include radially adjusting the position of the at least two jacking tools relative to the outer housing to orient the bearing relative to the internal rotatable member. For example, adjusting the radial position of the at least two jacking tools relative to the outer housing may include adjusting the position of the outer bushing relative to the respective port.

BRIEF DESCRIPTION OF THE DRAWINGS

The accompanying drawings, which are incorporated in and constitute a part of this specification, illustrate one or more embodiments of the invention and, together with a general description of the invention given above, and the detailed description given below, serve to explain the invention.

FIG. 7 is a perspective view of a jacking tool in accordance with an embodiment of the present invention;

FIG. 8 is a disassembled perspective view of the jacking tool illustrated in FIG. 7;

DETAILED DESCRIPTION

Figure 1:
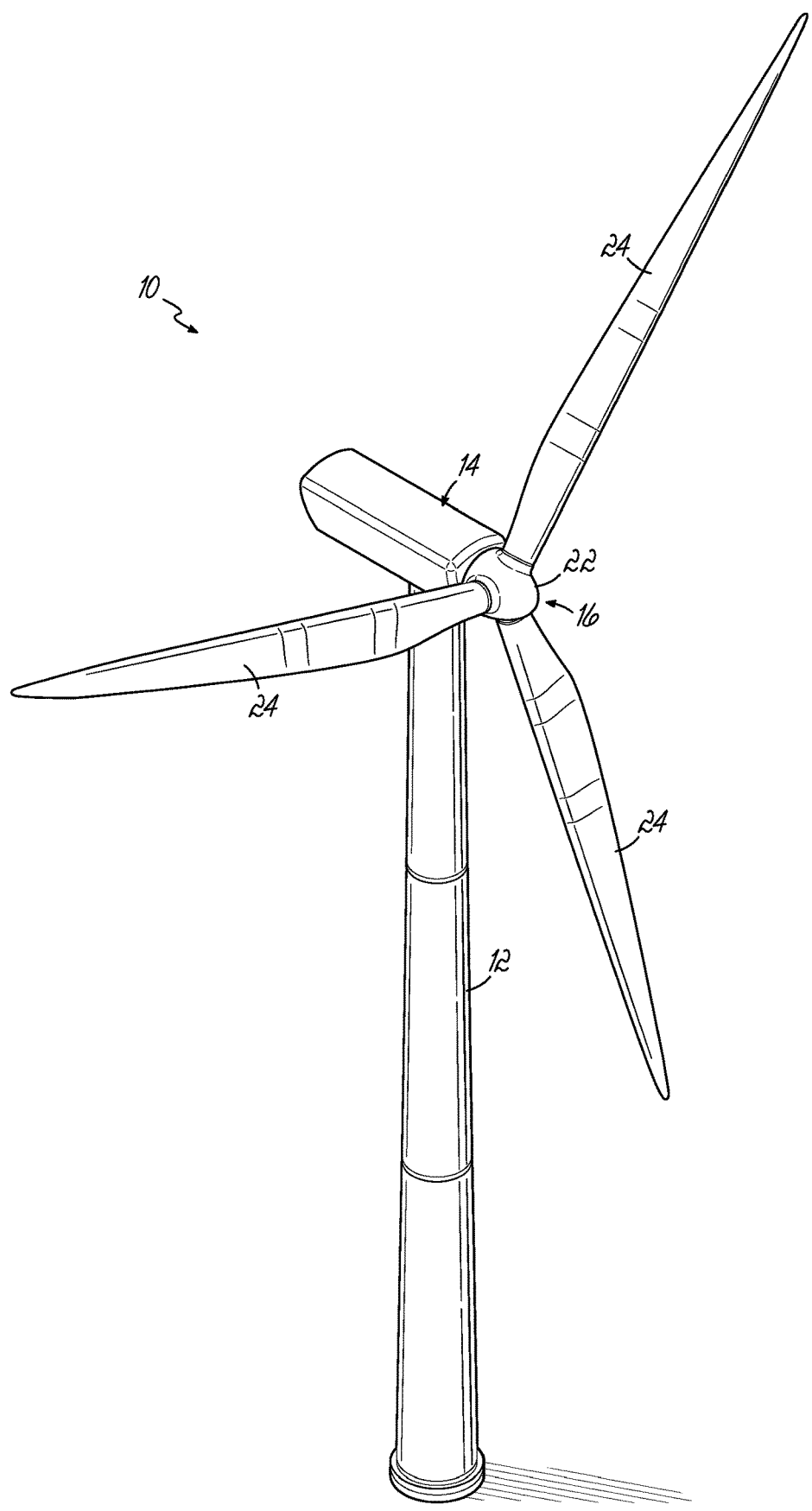
FIG. 1 is a perspective view of a horizontal axis wind turbine.
Figure 2:
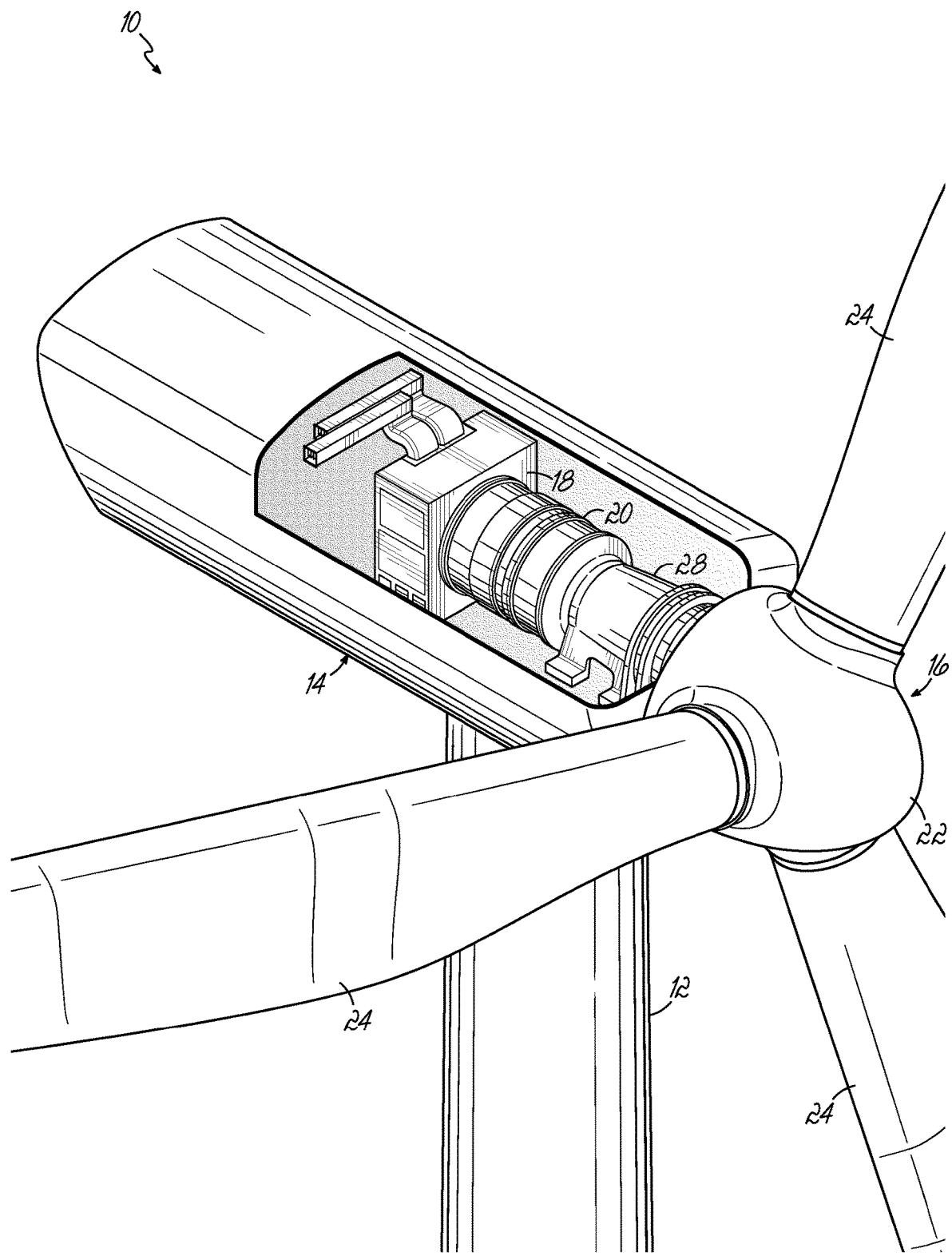
FIG. 2 is an enlarged partial perspective view of the wind turbine of FIG. 1 illustrating wind turbine components in the nacelle.

With reference to FIGS. 1 and 2, a wind turbine 10 includes a tower 12, a nacelle 14 disposed at the apex of the tower 12, and a rotor 16 operatively coupled to a generator 18 via a gearbox 20 housed inside the nacelle 14. In addition to the generator 18 and gearbox 20, the nacelle 14 may house various components needed to convert wind energy into electrical energy and to operate and optimize the performance of the wind turbine 10. The tower 12 supports the load presented by the nacelle 14, rotor 16, and other wind turbine components housed inside the nacelle 14 and operates to elevate the nacelle 14 and rotor 16 to a height above ground level or sea level, as may be the case, at which air currents having lower turbulence and higher velocity are typically found.

The rotor 16 may include a central hub 22 and a plurality of blades 24 attached to the central hub 22 at locations distributed about the circumference of the central hub 22. In the representative embodiment, the rotor 16 includes three blades 24, however the number may vary. The blades 24, which project radially outward from the central hub 22, are configured to interact with passing air currents to produce rotational forces that cause the central hub 22 to spin about its longitudinal axis. The design, construction, and operation of the blades 24 are familiar to a person having ordinary skill in the art of wind turbine design and may include additional functional aspects to optimize performance. For example, pitch angle control of the blades 24 may be implemented by a pitch control mechanism (not shown) responsive to wind velocity to optimize power production in low wind conditions, and to feather the blades if wind velocity exceeds design limitations.

The rotor 16 may be coupled to the gearbox 20 directly or, as shown, indirectly via a main shaft 26 extending between the hub 22 and the gearbox 20. The main shaft 26 rotates with the rotor 16 and is supported within the nacelle 14 by a main bearing support 28 which supports the weight of the rotor 16 and transfers the loads on the rotor 16 to the tower 12. The gearbox 20 transfers the rotation of the rotor 16 through a coupling to the generator 18.

Wind exceeding a minimum level may activate the rotor 16, causing the rotor 16 to rotate in a direction substantially perpendicular to the wind, applying torque to the input shaft of the generator 18. The electrical power produced by the generator 18 may be supplied to a power grid (not shown) or an energy storage system (not shown) for later release to the grid as understood by a person having ordinary skill in the art. In this way, the kinetic energy of the wind may be harnessed by the wind turbine 10 for power generation.

Figure 3:
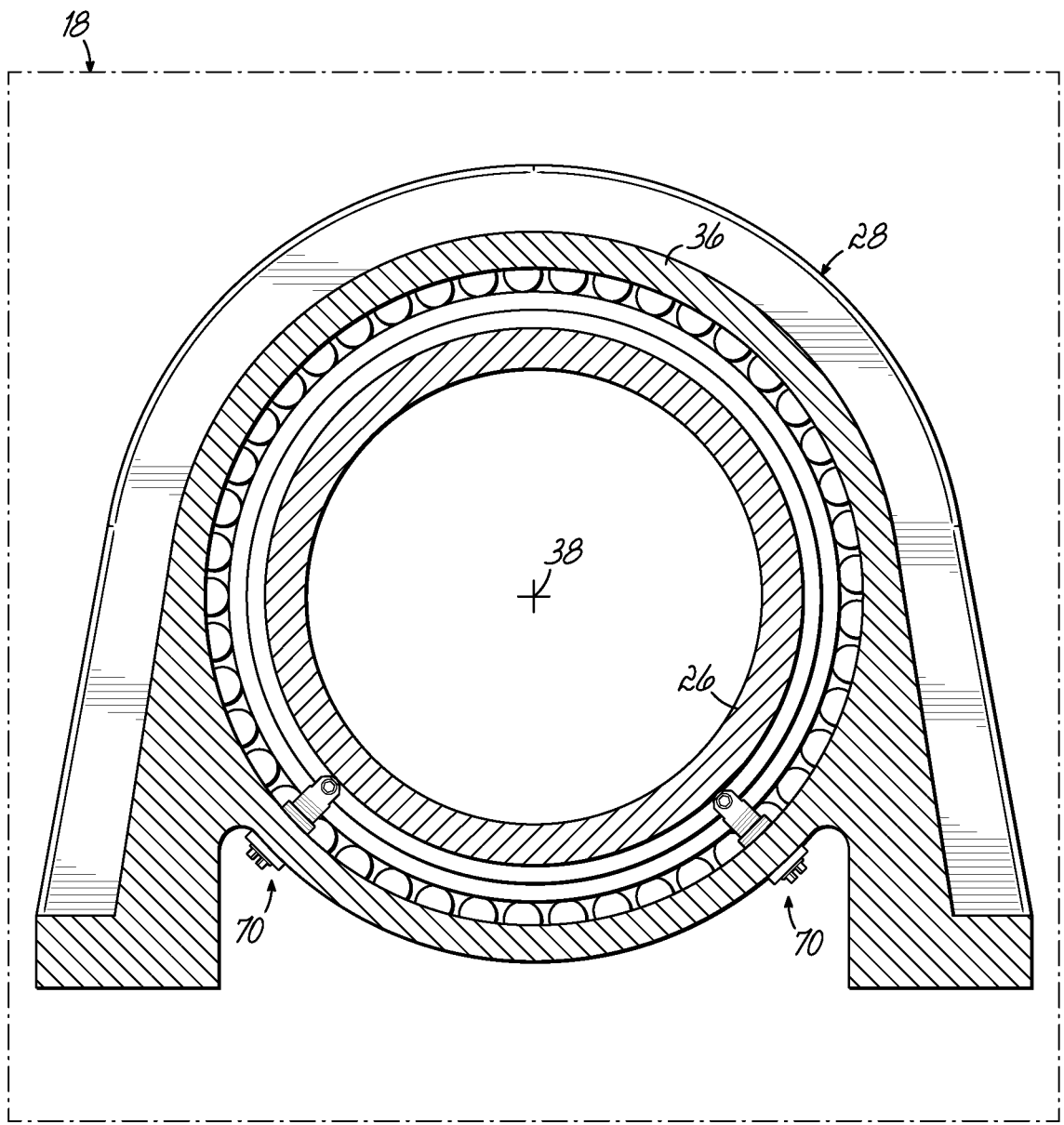
FIG. 3 is a schematic cross-sectional view of the main bearing support illustrated in FIG. 2.
Figure 4:
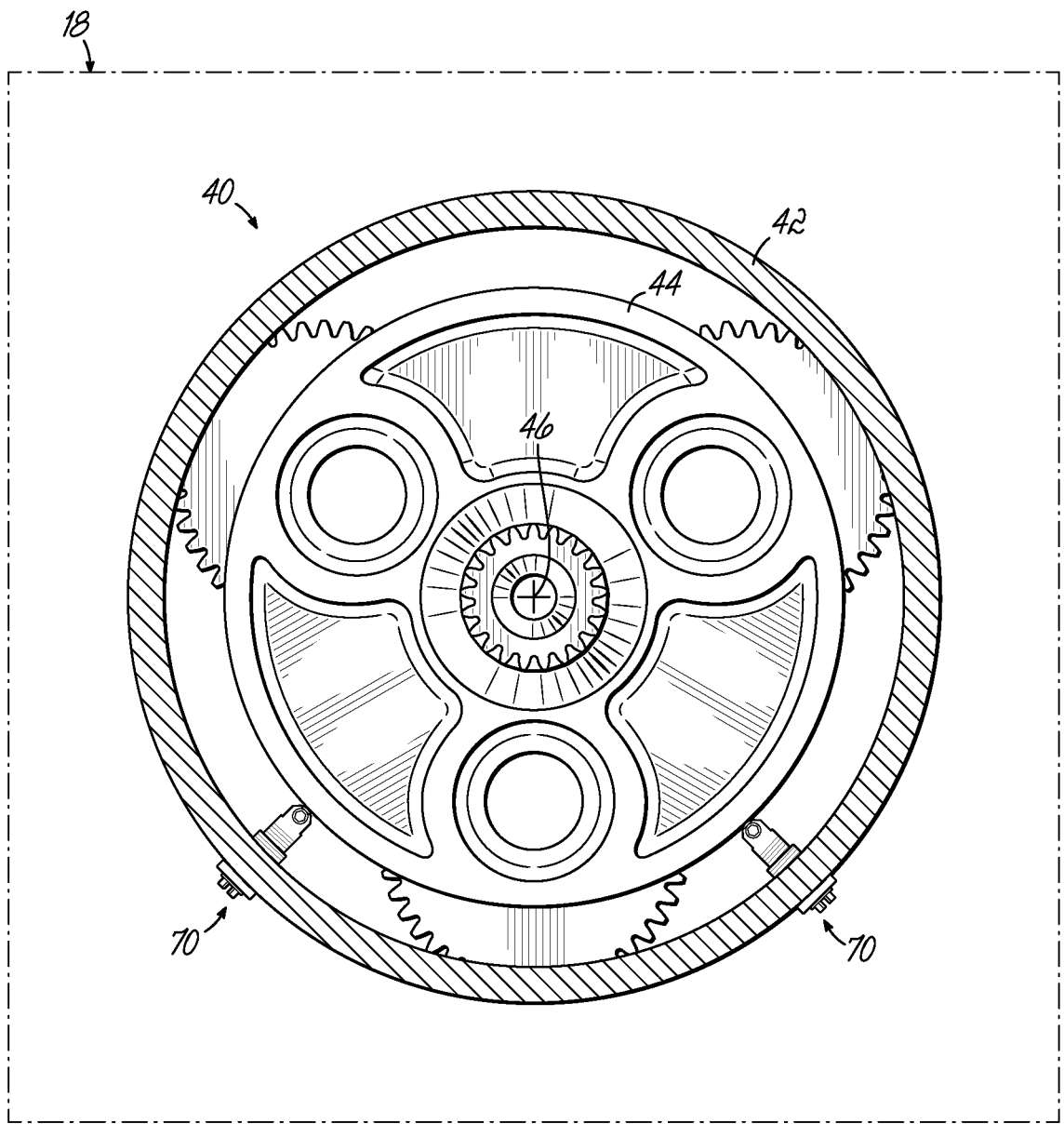
FIG. 4 is a schematic cross-sectional view of the gearbox illustrated in FIG. 2.
Figure 5:
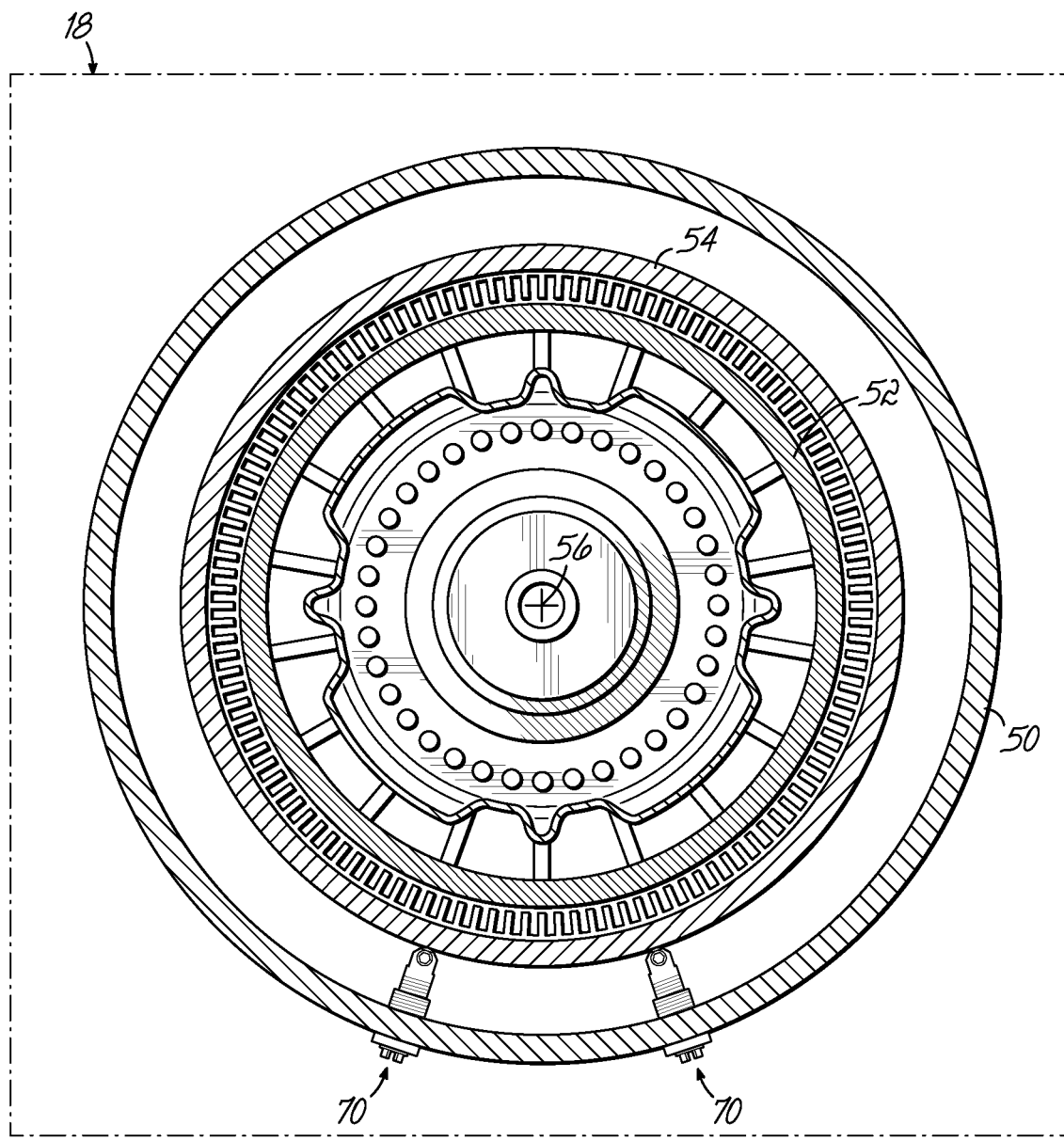
FIG. 5 is a schematic cross-sectional view of the generator illustrated in FIG. 2.

As discussed above, a number of wind turbine components in the nacelle 14 are subject to wear, breakage and other events that may prompt maintenance processes to repair or replace parts of the wind turbine components, or to otherwise improve the operation of the wind turbine components. By way of example and without limitation, maintenance processes on the main bearing support 28, gearbox 20, and generator 18 may be necessary during the operating life of the wind turbine 10. These wind turbine components may be generally characterized as having an outer housing and an internal member disposed within outer housing and configured to rotate relative to the outer housing during use of the wind turbine 10 in the normal course. In an exemplary embodiment, the outer housing may be configured to be substantially stationary and the internal rotatable member may be configured to rotate about an axis of rotation within and relative to the stationary outer housing. For example, and as schematically illustrated in FIG. 3, in the case of the main bearing support 28, a main bearing housing 36 is fixed to the floor of the nacelle 14 and is configured to receive the main shaft 26 through the main bearing housing 36. The main shaft 26 is coupled to the rotor 16 and is configured to rotate within and relative to the main bearing housing 36 about rotational axis 38. FIG. 4 schematically illustrates a gearbox 20 having a gearbox stage 40. The gearbox stage 40 includes a gearbox housing 42 and a planet carrier 44 disposed within the gearbox housing 42. The planet carrier 44 is configured to rotate relative to the gearbox housing 42 about rotational axis 46. Furthermore, FIG. 5 schematically illustrates a generator 18 including a generator housing 50 and a stator 52 and rotor 54 positioned within the generator housing 50 for generating electrical energy. The stator 52 typically includes coils and is generally fixed relative to the housing 50 so as to be substantially stationary. The rotor 54, on the other hand, typically includes magnetic elements and is rotatable within the housing 50 and relative to the stator 52 (and thus generator housing 50) about a rotational axis 56.

Figure 6:
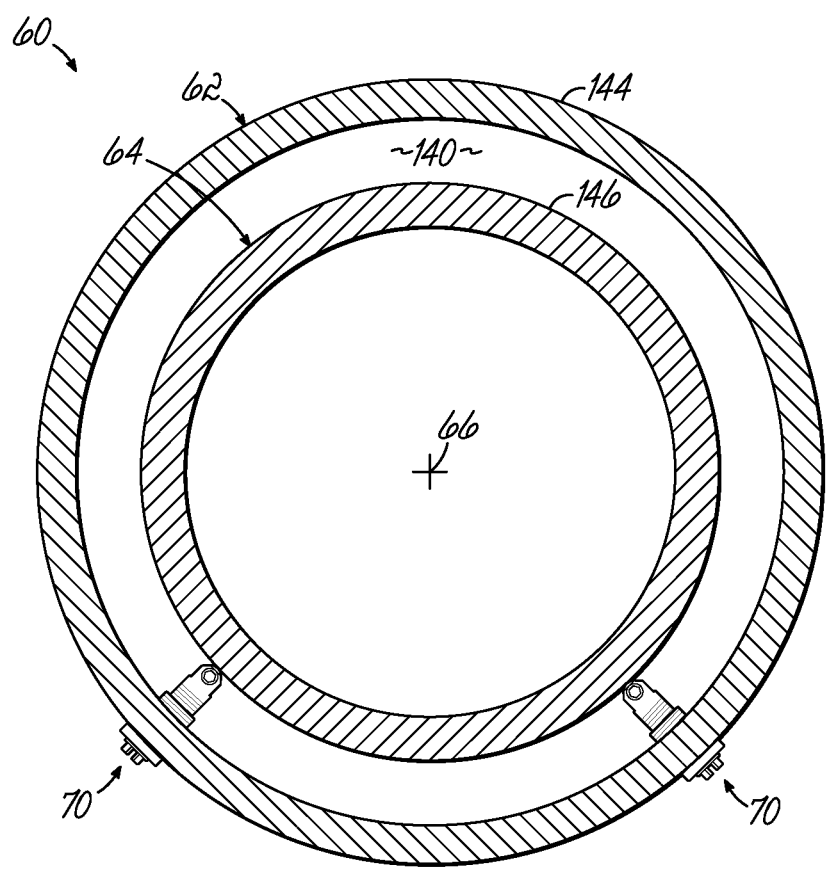
FIG. 6 is a cross-sectional view of a generalized wind turbine component having an outer housing and an internal rotatable member disposed within the outer housing.
Figure 9:
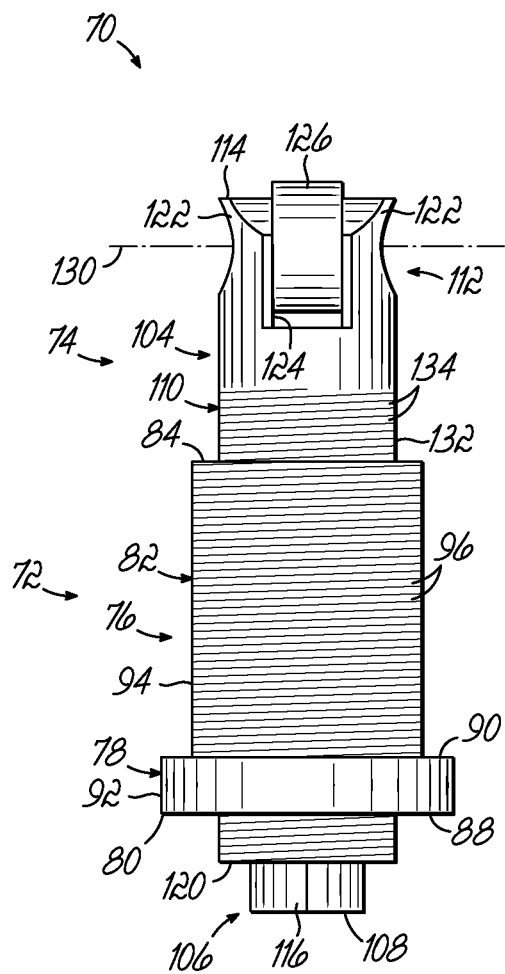
FIG. 9 is a side elevation view of the jacking tool illustrated in FIG. 7.
Figure 10:
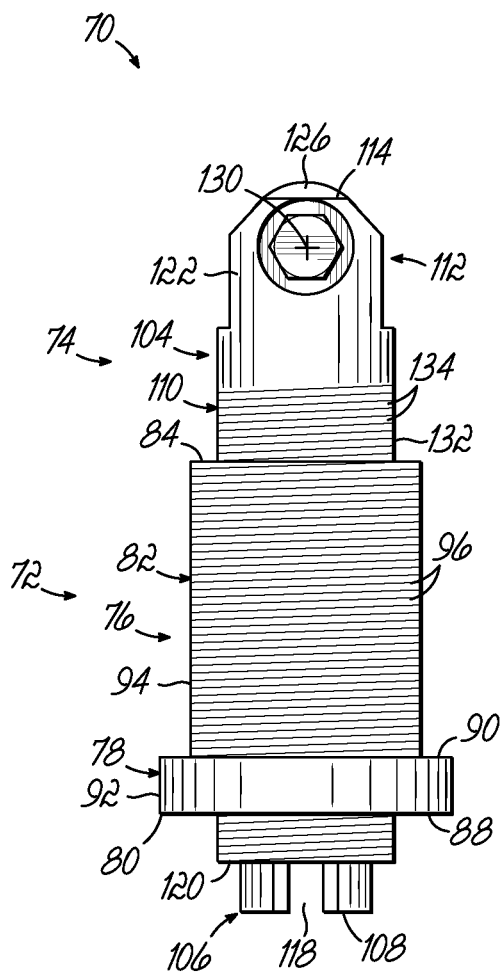
FIG. 10 is another side elevation view of the jacking tool illustrated in FIG. 7.

FIG. 6 illustrates a schematic, generalized wind turbine component 60 having an outer housing 62 and an internal rotatable member 64 configured to rotate relative to the outer housing 62 and about a rotational axis 66. It should be recognized that the wind turbine component 60 may represent the main bearing support 28, the gearbox 20 (or stages of the gearbox 20), the generator 18, or other wind turbine components having the general characteristics described above. As discussed above, during a maintenance process, it may be important to support the internal rotatable member 64 relative to the outer housing 62 in order to maintain the position of the rotational axis 66. Allowing relative movements between the internal rotatable member 64 and the outer housing 62 during the maintenance process may negatively impact a technician's ability to reassemble the wind turbine component for optimal operation of the component. Moreover, in some instances of the maintenance process, it may be desirable or necessary to rotate the internal rotatable member 64 relative to the outer housing 62 as the internal rotatable member 64 is being supported within the outer housing 62.

To achieve these and other goals, and as illustrated in FIGS. 3-6, a plurality of jacking tools 70 may be provided, wherein each jacking tool 70 is configured to support the internal rotatable member 64 within the outer housing 62 and to allow the internal rotatable member 64 to rotate relative to the outer housing 62 about rotational axis 66. As illustrated in FIGS. 7-12, in an exemplary embodiment the jacking tool 70 includes an outer bushing 72 and an inner support pin 74 movably coupled to the outer bushing 72. In one embodiment, the outer bushing 72 includes a generally T-shaped elongate body 76 having a collar 78 at a proximal end 80, a shaft 82 extending away from the collar 78 and terminating at a distal end 84, and a central passageway 86 extending through the collar 78 and shaft 82 from the proximal end 80 to the distal end 84. The collar 78 and shaft 82 are each generally cylindrical, with the collar 78 having a diameter greater than a diameter of the shaft 82 to define a proximal face 88, distal face 90, and an outer sidewall 92 extending therebetween. In an exemplary embodiment, the outer diameter of the shaft 82 may be substantially constant along the length of the shaft 82. Additionally, the inner diameter of the passageway 86 may also be substantially constant along the length of the outer bushing 72.

In an exemplary embodiment, and for reasons discussed in more detail below, the outer bushing 72 may be configured to be both internally threaded and externally threaded. More particularly, at least a portion of the outer surface 94 of the shaft 82 may include external threads 96. In one embodiment, the external threads 96 may extend the full length of the shaft 82 from the distal face 90 of the collar 78 to the distal end 84. In an alternative embodiment, only a portion of the length of the shaft 82 (e.g., between about 30% and about 70%) may include the external threads 96, such as a portion more adjacent the collar 78. Similarly, at least a portion of the passageway 86 may include internal threads 98. More particularly, in one embodiment, the internal threads 98 may extend the full length of the passageway 86 from the proximal end 80 to the distal end 84. In an alternative embodiment, only a portion of the length of the passageway (e.g., between about 30% and about 70%) may include the internal threads 98, such as a portion more adjacent the collar 78. In one embodiment, the internal threads 98 may be configured differently from the external threads 96. By way of example, the pitch of the internal threads 98 may be different (e.g., smaller) than the pitch of the external threads 96. Such pitch difference will facilitate an axial movement between elements coupled to the external threads 96 and the internal threads 98, respectively, without also creating a rotational movement between the same. Other differences in the threads 96, 98 may also exist. The outer bushing 72 may be made from a suitable metal, such as steel. Other materials, however, may also be possible.

In an exemplary embodiment, the inner support pin 74 includes a generally cylindrical elongate body 104 having a tool interface 106 at a proximal end 108, an intermediate shaft portion 110, and a bearing 112 at a distal end 114. The tool interface 106 is configured to engage with a tool (not shown), such as a driver, wrench, etc., for rotating the inner support pin 74 about its central axis. In one embodiment, the tool interface 106 may include a pair of raised bosses 116 spaced apart by a central gap 118. Moreover, the pair of bosses 116 may form a hexagonal head or other irregularly-shaped head for mating with a suitable tool (e.g., wrench, socket driver, etc.). It should be understood, however, that the tool interface 106 is not limited to that described above but may take other suitable forms that facilitate turning of the inner support pin 74 about its central axis. The intermediate shaft portion 110 may be sized slightly larger than the tool interface 106 to define a proximal face 120. In an exemplary embodiment, the outer diameter of the intermediate shaft portion 110 may be substantially constant along the length of the shaft portion 110.

As will be discussed in more detail below, the bearing 112 at the distal end 114 of the inner support pin 74 is configured to engage and support the weight of the internal rotatable member 64 but allow the internal rotatable member to move relative to the inner support pin 74. In this regard, the bearing 112 at the distal end 114 of the inner support pin 74 is configured to include a roller element of some type that facilitates the relative movement between the inner support pin 74 and the internal rotatable member 64. In an exemplary embodiment, the roller element may include a wheel (e.g., a cylindrical roller). More particularly and as illustrated in FIGS. 7-12, in one embodiment the bearing 112 includes a pair of spaced apart ears 122 defining a channel 124 therebetween. A wheel 126 is disposed in the channel 124 and coupled to the ears 122 through an axle 128 on which the wheel 126 is configured to rotate and which defines a rotational axis 130 about which the wheel 126 rotates. The wheel 126 projects distally beyond the end of the ears 122 such that the wheel 126 constitutes the most distal part of the inner support pin 74. In this way, the wheel 126 is the portion of the inner support pin 74 that engages with the internal rotatable member 64 during use of the jacking tool 70. The wheel 126 may be made from a suitable metal, such as steel. Other materials, however, may also be possible including various composites.

In an exemplary embodiment, the inner support pin 74 is configured to be externally threaded. More particularly, at least a portion of the outer surface 132 of the intermediate shaft portion 110 may include external threads 134. In one embodiment, the external threads 134 may extend the full length of the intermediate shaft portion 110. In an alternative embodiment, only a portion of the length of the intermediate shaft portion 110 (e.g., between about 30% and about 70%) may include the external threads 134, such as a portion more adjacent the proximal end 108 of the inner support pin 74. The external threads 134 are configured to mate with the internal threads 98 of the outer bushing 72, and thus have similar thread characteristics. The inner support pin 74 may be made from a suitable metal, such as steel. Other materials, however, may also be possible.

Figure 11:
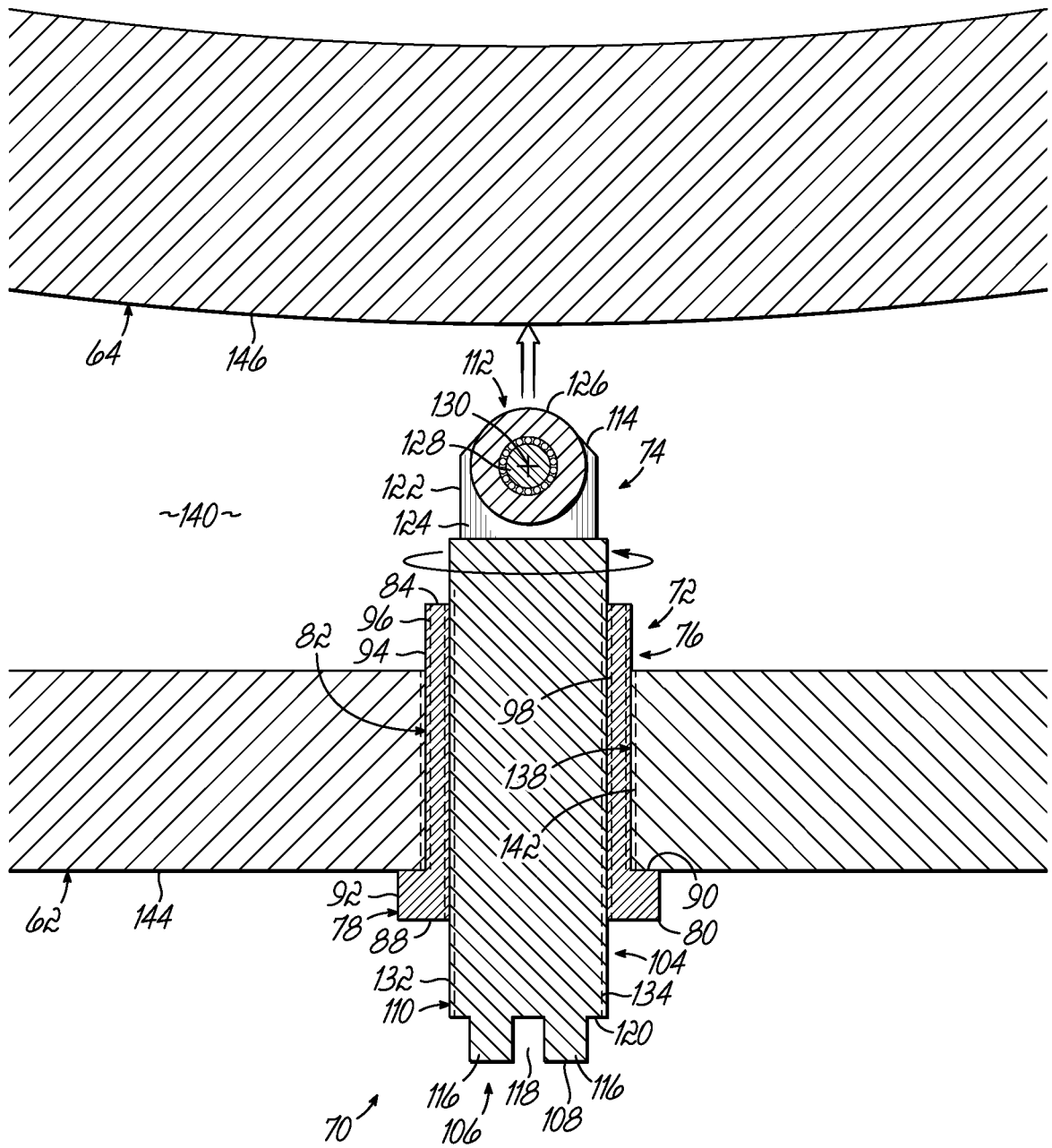
FIG. 11 is an enlarged partial cross-sectional view demonstrating the use of the jacking tool to support the internal rotatable member relative to the outer housing.
Figure 12:
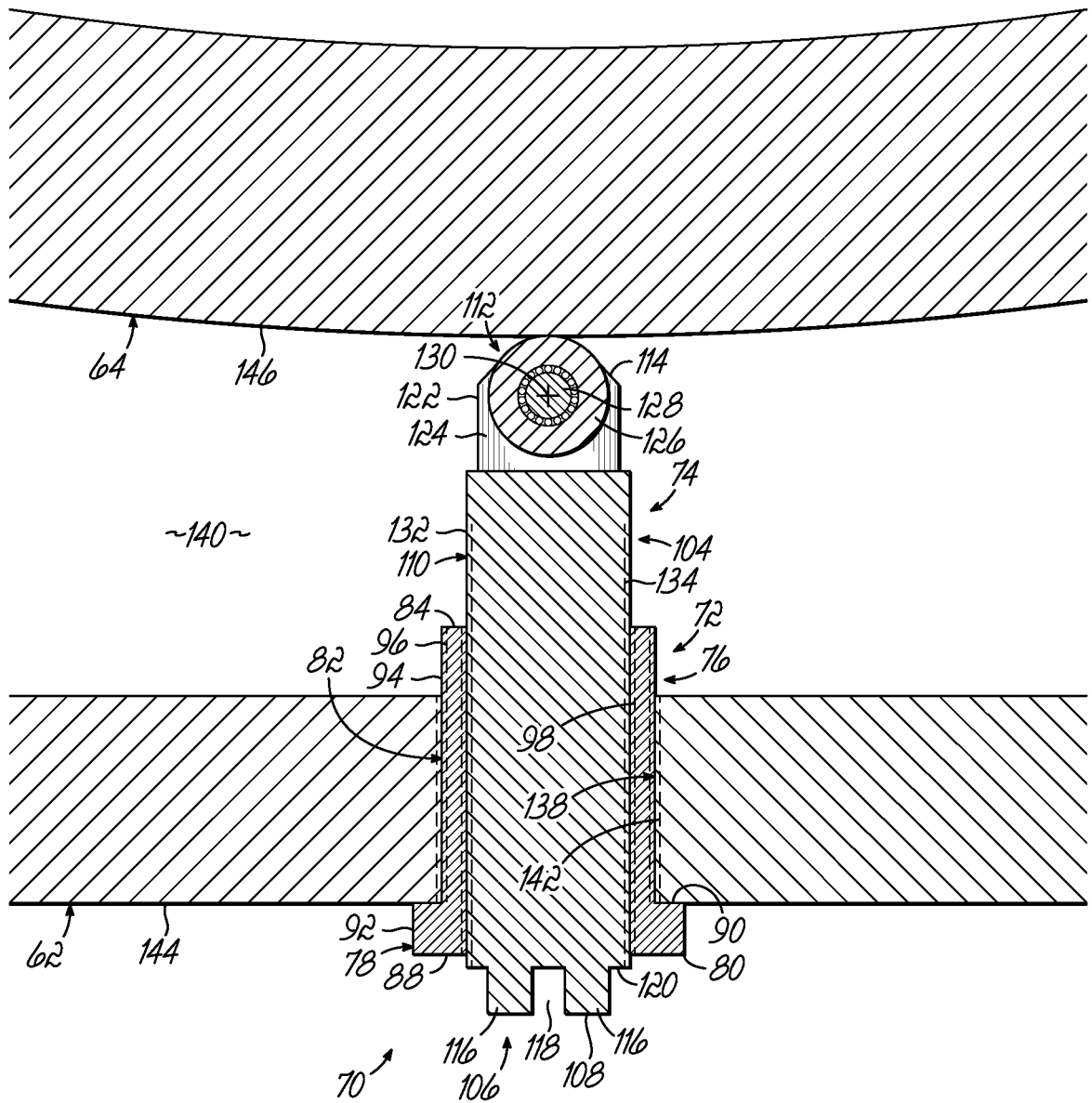
FIG. 12 is another enlarged partial cross-sectional view demonstrating the use of the jacking tool to support the internal rotatable member relative to the outer housing.

Use of the jacking tool 70 on the wind turbine component 60 will now be described in reference to FIGS. 11 and 12. First, the inner support pin 74 may be inserted into the passageway 86 of the outer bushing 72 by some initial amount. For example, outer bushing 72 may be held stationary while the inner support pin 74 is rotated to engage the external threads 134 on the support pin 74 and the internal threads 98 of the passageway 86 in the outer bushing 72. Once the inner support pin 74 and outer bushing 72 are initially coupled together, the jacking tool 70 may be coupled to the outer housing 62 of the wind turbine component 60. In this regard, in an exemplary embodiment, the outer housing 62 includes a plurality of ports 138 (e.g., at least two ports) in the outer housing 62 that provide access to the interior 140 of the outer housing 62 adjacent to where the internal rotatable member 64 is generally disposed. The ports 138 are threaded with internal threads 142 and are normally closed off by a threaded plug (not shown) when the jacking tool 70 is not in use. The internal threads 142 are configured to mate with the external threads 96 of the outer bushing 72, and thus have similar thread characteristics. When a maintenance process is desired for the wind turbine component 60 in which the jacking tool 70 is to be used, the threaded plugs may be removed to provide an open port 138 that is configured to receive a jacking tool 70 therein.

In this regard, the assembled jacking tool 70 (i.e., the coupled outer bushing 72 and inner support pin 74) may be inserted into the port 138 until the external threads 96 of the outer bushing 72 engage the internal threads 142 of the port 138. At this point, the outer bushing 72 (and the assembled support pin 74) may be rotated such that the outer bushing 72 is firmly secured within the port 138. In one embodiment, for example, the outer bushing 72 may be rotated relative to the port 138 until the collar 78 engages with an outer surface 144 of the outer housing 62, at which point the bushing 72 can not be rotated any further. In an alternative embodiment, however, the bushing 72 may be rotated relative to the port 138 until the collar 78 is adjacent, but slightly spaced from, the outer surface 144 of the outer housing 62.

While in the above, the inner support pin 74 was coupled to the outer bushing 72 when the outer bushing 72 was inserted into the port 138 of the outer housing 62, the invention is not so limited. In an alternative embodiment, for example, the outer bushing 72 may be secured within the port 138 of the outer housing 62 without the inner support pin 74 being disposed therein. In this embodiment, subsequent to securing the outer bushing 72 within the port 138 of the outer housing 62, the inner support pin 74 may be inserted into the passageway 86 of the outer bushing 72 and rotated to engage the threads 132, 98, and thereby movably couple the inner support pin 74 within the outer bushing 72.

In any event, with the outer bushing 72 secured within the port 138 and the inner support pin 74 secured within the bushing 72. The inner support pin 74 may be rotated relative to the outer bushing 72 with a suitable tool (not shown) to move the inner support pin 74 axially and toward the internal rotatable member 64 disposed within the outer housing 62. With further relative rotation of the inner support pin 74, the bearing 112 at the distal end 114 of the support pin 74 is configured to engage an outer surface 146 of the internal rotatable member 64. For example, when the bearing 112 includes the wheel 126, the wheel 126 is configured to engage the outer surface 146 of the internal rotatable member 64. In this embodiment, however, to provide rotation of the internal rotatable member 64 while being supported by the jacking tool 70, the wheel 126 must be oriented relative to the internal rotatable member 64 in a specific manner. More particularly, in this embodiment, the axle 128 that supports the wheel 126, and thus the rotational axis 130 about which the wheel 126 rotates, is configured to be substantially parallel (e.g., within about +1-5 degrees) to the rotational axis 66 of the internal rotatable member 64. In this way, the direction of rotation of the internal rotatable member 64 and the wheel 126 are generally aligned and the wheel 126 supports the rotation of the internal rotatable member 64 relative to the outer housing 62 about rotational axis 66.

Because the inner support pin 74, and more particularly the wheel 126, has a specific orientation relative to the internal rotatable member 64, the outer bushing 72 may have to be adjusted relative to the port 138 in order that the rotational axis 130 of the wheel 126 and the rotational axis 66 of the internal rotatable member 64 are substantially parallel to each other. Thus, for example, if upon engaging the inner support pin 74 with the outer surface 146 of the internal rotatable member 64, the wheel 126 is not properly oriented, then the inner support pin 74 may be moved proximally out of the outer bushing 72 by a slight amount (to relieve any pressure on the wheel 126), the outer bushing 72 may be moved proximally out of the port 138 by some amount (and the inner support pin 74 moves with the outer bushing 72), and then the inner support pin 74 is moved distally while keeping the outer bushing 72 fixed relative to the port 138. It should be recognized that this method may be repeated as necessary in order to have the rotational axes 130 of the wheel 126 and the rotational axis 66 of the internal rotatable member 64 substantially parallel to each other. It should be further recognized that between the movement of the outer bushing 72 within the port 138 and the movement of the inner support pin 74 within the outer bushing 72, there may be other ways of adjusting the position of the jacking tool 70 relative to the outer housing 62 in order to provide the alignment between the wheel 126 and the internal rotatable member 64. For example, the difference in the threads 96, 142 that control relative movement between the outer bushing 72 and the port 138 of the outer housing 62, and threads 98, 134 that control relative movement of the inner support pin 74 relative to the outer bushing 72 may be utilized to properly orient the wheel 126 relative to the internal rotatable member 64. Thus, there may be multiple ways to have the rotational axes 130 of the wheel 126 and the rotational axis 66 of the internal rotatable member 64 substantially parallel to each other.

As illustrated in FIGS. 3-6, to adequately support an internal rotatable member 64 of the size and weight characteristic of wind turbine applications, a plurality of jacking tools 70 may have to be used. For example, in an exemplary embodiment, two jacking tools 70 may be used to support the internal rotatable member 64 relative to the outer housing 62. However, in an alternative embodiment, more than two jacking tools 70 may be used. In this regard, the at least two jacking tools 70 may be strategically located about the periphery of the wind turbine component 60 to support the weight of the internal rotatable member 64. Thus, for example, the at least two jacking tools 70 may be positioned along a lower portion of the wind turbine component 60 so that the jacking tools 70 generally operate against gravity. However, a jacking tool 70 may be located along side and upper portions of the wind turbine component 60 as well. The number of jacking tools 70 may be selected to support the internal rotatable member 64 in a stable manner.

In this regard, the outer housing 62 of the wind turbine component 60 may include a plurality of ports 138 (e.g., at least two ports) disposed about the periphery of the outer housing 62, such as along a lower portion of the outer housing 62. As noted above, these ports 138 may be normally closed off by threaded plugs (not shown) during normal operation of the wind turbine component 60. When a maintenance process is to be performed on the wind turbine component 60, the threaded plugs may be removed and a jacking tool 70 may be engaged with each of the ports 138 as described above. Of course, in various embodiments, not all of the ports 138 in the outer housing 62 have to be used in order to support an internal rotatable member 64 during a maintenance process.

In one embodiment, the plurality of jacking tools 70 may be configured to support the internal rotatable member 64 at one or more longitudinal positions along the length of the wind turbine component 60, wherein the longitudinal axis is generally in the direction from the front of the component 60 toward the rear of the component 60 (e.g., generally from the rotor 16 toward the generator 18 in the reference frame illustrated in FIG. 2). For example, the plurality of jacking tools 70 may generally lie within a support plane that is substantially perpendicular to the longitudinal axis of the wind turbine component 60. FIG. 6, for example, illustrates a plurality of jacking tools 70 in a first cross-sectional plane of the wind turbine component 60. It should be recognized, however, that it may be necessary to support an internal rotatable member 64 within the outer housing 62 at more than one longitudinal location along the length of the internal rotatable member 64. This may be especially true for long internal rotatable members. For example, for long internal rotatable members 64, it may be desirable to support the rotatable member 64 adjacent a first end of the rotatable member and adjacent a second end of the rotatable member. Thus, the support arrangement may include a first group of jacking tools 70 that lie within a first support plane that is substantially perpendicular to the longitudinal axis of the internal rotatable member 64, and a second group of jacking tools 70 that lie within a second support plane that is substantially perpendicular to the longitudinal axis of the internal rotatable member 64, wherein the first and second support planes are longitudinally spaced from each other. Of course, more or less support planes may be provided depending on the particular internal rotatable member 64. While it may be preferred that the plurality of jacking tools 70 be arranged in one or more support planes, aspects of the invention are not so limited and the jacking tools 70 may have other support arrangements configured to adequately support the internal rotatable member 64 relative to the outer housing 62.

No matter the particular arrangement, as discussed above the plurality of jacking tools 70 are configured to support the internal rotatable member 64 relative to the outer housing 62 so as to maintain the relative position of the rotational axis 66. In other words, during the maintenance process, it may be undesirable for the rotational axis 66 of the internal rotatable member 64 to shift, cant, tilt or otherwise move out of its normal alignment within the outer housing 62. Any disruption of the rotational axis 66 of the internal rotatable member 64 may make assembly/disassembly of the wind turbine component 60 to/from adjacent components more complex and difficult. The jacking tools 70 are configured to avoid the displacement of the rotational axis 66 within the outer housing 62 during the maintenance process.

Additionally, in some applications it may be desirable to have the internal rotatable member be selectively rotatable while also being supported (e.g., radially supported) by the jacking tools 70. For example, to disengage a gearbox stage from an adjacent gearbox stage, the sun pinion of the gearbox stage must be moved out of engagement with the pinions in the adjacent gearbox stage. As the teeth on the sun pinion are of helical design, in order to perform the disengagement, the sun pinion must be rotated as the gearbox stages are being separated from each other. This rotation of the sun pinion may be achieved by rotating the planet carrier within the gearbox stage and operatively coupled to the sun pinion. In this example, the planet carrier operates as the internal rotatable member for the gearbox stage and the jacking tools 70, and the bearing 112 at the distal ends 114 of the jacking tools 70 provide for the selective rotation of the planet carrier that allows the sun pinion to be more easily disengaged from the adjacent gearbox stage. Thus, the jacking tools 70 of the present invention provide substantial benefits to certain maintenance processes of wind turbine components 60 in wind turbine 10.

Figure 13:
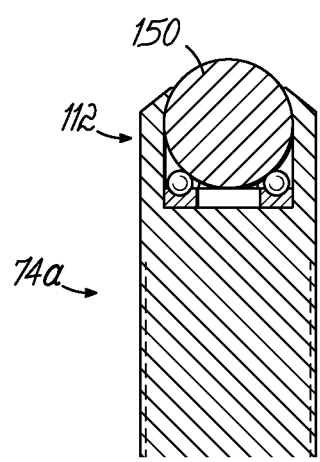
FIG. 13 is a partial illustration of a support pin of a jacking tool in accordance with another embodiment of the present invention.

In the above, the bearing 112 of the inner support pin 74 took the form of a wheel or cylindrical roller 126 rotatable about a rotational axis 130, which prompted a particular orientation between the wheel 126 and the internal rotatable member 64. FIG. 13 illustrates an alternative embodiment which obviates the need to have a specific orientation between the bearing 112 and the internal rotatable member 64. In this embodiment, the bearing 112 at the distal end 114 of inner support pin 74a may take the form of a ball bearing 150 (e.g., a spherical ball). The ball bearing 150 is capable of rotating in any direction and is not limited to rotations relative to a single axis, as is the case for the wheel 126. This simplifies the use of the jacking tool 70. More particularly, the trial-and-error approach of having the wheel 126 in alignment with the rotational axis 66 of the internal rotatable member 64 is obviated with inner support pin 74a. Thus, in this embodiment the outer bushing 72 may be inserted into the port 138 and the inner support pin 74a rotated to move the support pin 74a distally within the bushing 72 and toward the internal rotatable member 64. No matter when the ball bearing 150 engages the outer surface 146 of the internal rotatable member 64, the ball bearing 150 is capable of rotating in the direction of the internal rotatable member 64 as it rotates about its rotational axis 66. Accordingly, use of the jacking tool may be simplified. Moreover, in this embodiment, the outer bushing 72 may be omitted and the support pin 74a may be externally threaded to couple to the threaded port 138.

Figure 14:
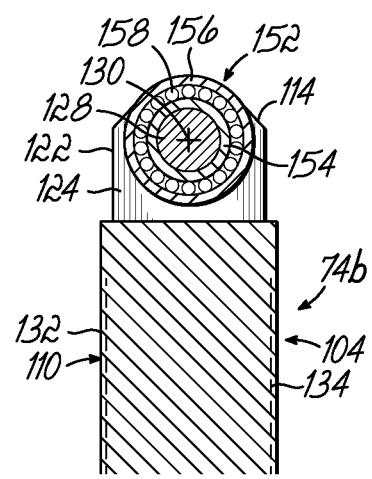
FIG. 14 is a partial illustration of a support pin of a jacking tool in accordance with another embodiment of the present invention.

FIG. 14 illustrates another alternative embodiment for the bearing 112 at the distal end 114 of the inner support pin 74b. In this embodiment, the bearing 112 may take the form of a spherical roller 152. More particularly, the spherical roller 152 may include an inner race 154 fixed to the axle 128 that extends between the ears 122 and an outer race 156 rotatable relative to the inner race 154. One or more rows (e.g., two rows) of roller bearings 158 may be disposed between the inner and outer races 154, 156 to facilitate the rotation of the outer race 156 relative to the inner race 154. The outer race 156 is configured to contact the internal rotatable member 64 during use. The spherical roller 152 allows for a certain amount of misalignment between the inner support pin 74b and the internal rotatable member 64 but yet is sufficient to support the weight of the internal rotatable member 64 and allow the internal rotatable member 64 to rotate about its rotational axis 66.

Figure 15:
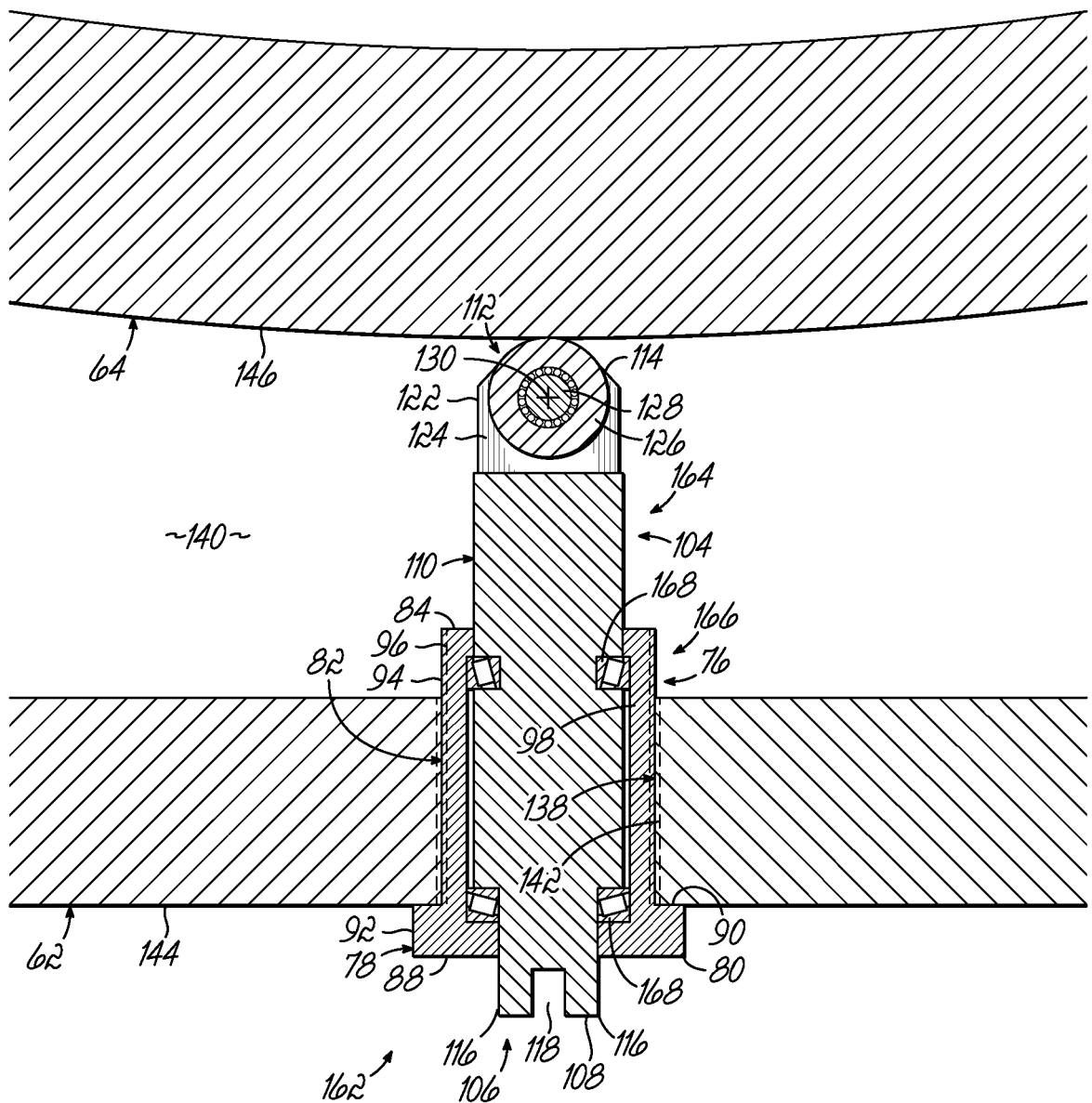
FIG. 15 is a cross-sectional view of a jacking tool in accordance with another embodiment of the present invention.

FIG. 15 illustrates another embodiment of a jacking tool 162 similar to the jacking tool 70 described above. Similar reference numbers will refer to similar features as those described above in reference to jacking tool 70. The primary difference between the jacking tool 162 and the jacking tool 70 described above is the manner in which the inner support pin 164 mounts to the outer bushing 166. In the jacking tool 70, the inner support pin 74 couples to the outer bushing 72 via a pair of threads 98, 134. This allowed the inner support pin 74 to move independently of the outer bushing 72. In the embodiment shown in FIG. 15, the inner support pin 164 effectively floats within the outer bushing 166. In other words, the threads 98, 134 are removed and the inner support pin 164 is rotatably mounted within the passageway 86 of the outer bushing 166 by one or more bearings 168. This arrangement allows the inner support pin 164 to rotate relative to the outer bushing 166 but does not allow relative axial movements of the inner support pin 164 relative to the outer bushing 166. The jacking tool 162 may still couple to the outer housing 62 through the engagement between the external threads 96 of the outer bushing 166 and the internal threads 142 of the port 138.

The use of the jacking tool 162 is similar to that described above. More particularly, the jacking tool 162 may be inserted into the port 138 until the external threads 96 of the outer bushing 166 engage the internal threads 142 of the port 138. At this point, the outer bushing 72 (and the support pin 164) may be rotated such that the outer bushing 72 is firmly secured within the port 138. The outer bushing 166 may be rotated relative to the port 138 until the collar 78 is adjacent, but slightly spaced from, the outer surface 144 of the outer housing 62. With the bearing 112 in near contact or light contact with the internal rotatable member 64, the inner support pin 164 may be rotated relative to the outer bushing 166 until the bearing is properly oriented relative to the internal rotatable member 64. When the bearing 112 is properly oriented, the inner support pin 164 may be held fixed and the outer bushing 166 further tightened such that the jacking tool 162 provides sufficient support to the internal rotatable member 64. It is noted that the difference in pitch of the internal threads 98 compared to the pitch of the external threads 96 of the bushing 166 facilitates this further tightening. In an alternative approach, the inner support pin 164 may be initially positioned in the proper orientation relative to the internal rotatable member 64, such as by a marking or other indicator on the outer housing 62 and/or support pin 164, and held in a fixed position as the outer bushing 166 is threaded into the port 138 and tightened in order for the jacking tool 162 to provide sufficient support to the internal rotatable member 64.

It should be understood that various alternative features described above for jacking tool 70 may also apply to jacking tool 162. For example, the bearing 112 may take the form of a ball bearing 150 (and avoid any orientation issue between the support pin 164 and the internal rotatable member 64) or a spherical roller 152 (to accommodate various misalignments between the support pin 164 and the internal rotatable member 64). Thus, various alternatives and combinations are possible and remain within the scope of the present invention.

For example, in one alternative embodiment the bearing 112 at the distal end 114 of the inner support pin 74, 164 may take the form of a spherical ball 150. As noted above, this obviates the orientation issues between the inner support pin 74, 164 and the internal rotatable member 64. As a consequence, a two-part jacking tool 70, 162 (i.e., an outer bushing 72, 166 and an inner support pin 74, 164 mounted therein) may no longer be necessary. Thus, the jacking tools may be formed from a single body support pin having external threads that allow the jacking tool to be coupled to the ports 138 in the outer housing 62. The jacking tool of this embodiment provides the same function as the jacking tools 70, 162 as it relates to support of the internal rotatable member 64 and allowing the internal rotatable member 64 to rotate while being supported, but has fewer parts and may be simpler in its construction and use.

Figure 16:
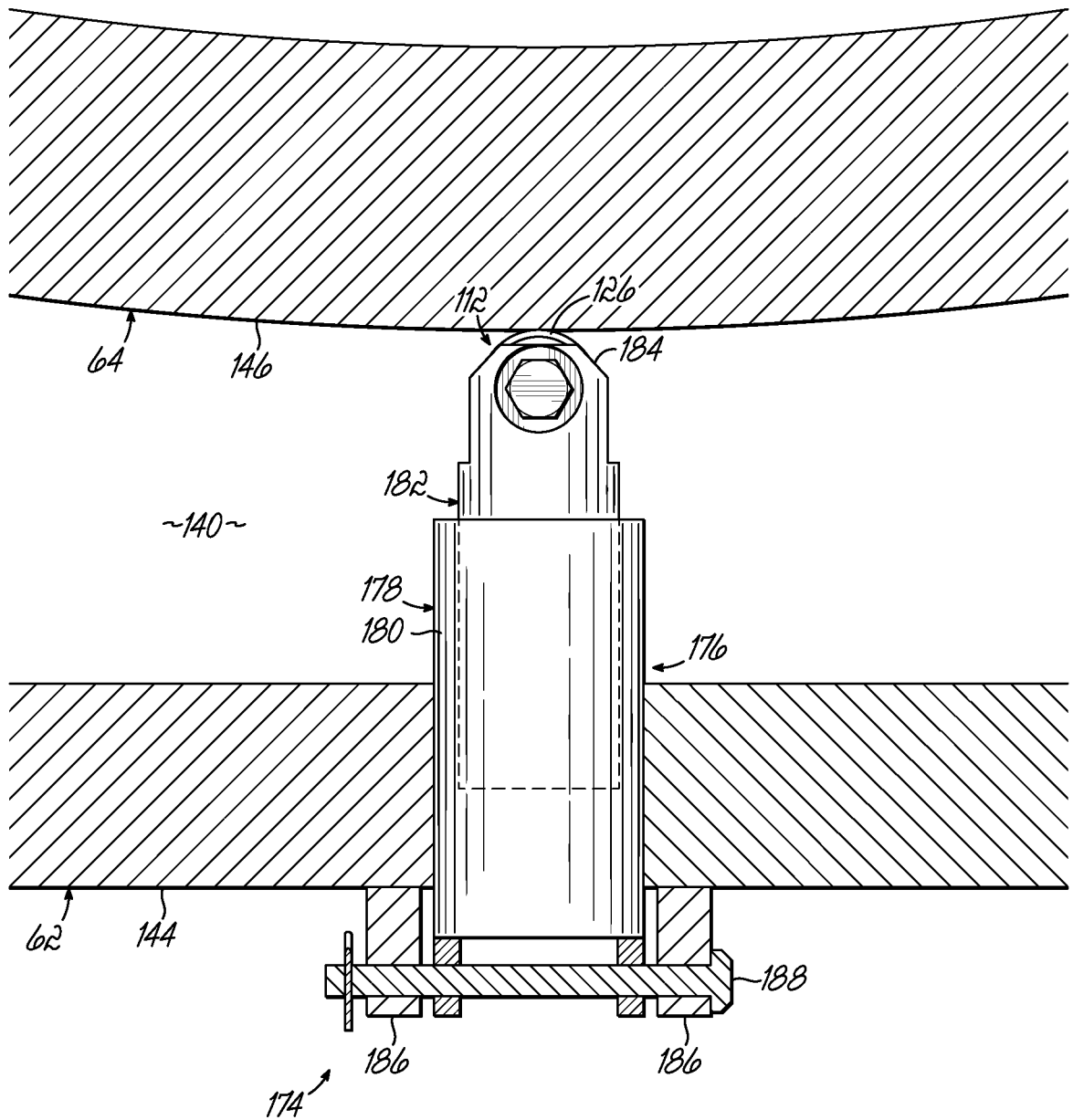
FIG. 16 is a cross-sectional view of a jacking tool in accordance with another embodiment of the present invention.

FIG. 16 illustrates a jacking tool 174 in accordance with another embodiment of the present invention. The jacking tool 174 of this embodiment does not have a two-part construction similar to those described above but has a support pin 176 that couples to the outer housing 62 and rotatably supports the internal rotatable member 64 similar to that described above. In this embodiment, the support pin 176 may take the form of a hydraulic actuator 178 having a base or housing 180 and an arm 182 selectively extendable/retractable from or into the housing 180. For example, the actuator 178 may be coupled to a controller (not shown) for controlling the movement of the arm 182 relative to the housing 180. The distal end 184 of the arm 182 may include the bearing 112 that engages with the internal rotatable member 64 similar to that described above. In this regard, the outer housing 62 and/or support pin 176 may include a mark or indicia to provide the proper orientation of the bearing 112 relative to the internal rotatable member 64.

As illustrated in FIG. 16, the jacking tool 174 may couple to the outer housing 62 in a different manner as described above. More particularly, while the jacking tools described above generally coupled to the outer housing 62 via threads in the ports 138, the jacking tool 174 may couple to the outer housing 62 via a support stanchion on the outer housing 62. By way of example, the support stanchion may include a pair of ears 186 spaced apart in order to receive the jacking tool 174 therebetween. A lock pin 188 may be used to couple the jacking tool 174 to the outer housing 62. When the jacking tool 174 is coupled to the outer housing 62, at least the arm 182 (and perhaps a portion of the housing 180) of the actuator 178 may be configured to extend through the port 138 toward the internal rotatable member 64. The controller may be operated so that the bearing 112 at the distal end 184 of the arm 182 engages the internal rotatable member 64 so as to rotatably support the internal rotatable member 64. The ports 138 may still include internal threads 142 so that when the jacking tools 174 are not in use, the ports 138 may be closed off by threaded plugs.

While the present invention has been illustrated by a description of various preferred embodiments and while these embodiments have been described in some detail, it is not the intention of the Applicant to restrict or in any way limit the scope of the appended claims to such detail. Additional advantages and modifications will readily appear to those skilled in the art. Thus, the various features of the invention may be used alone or in any combination depending on the needs and preferences of the user.

The invention claimed is:

1. A jacking tool for a wind turbine component having an outer housing and an internal rotatable member disposed in the outer housing and rotatable about a rotational axis, the jacking tool comprising:
  an outer bushing having a passageway extending through the outer bushing and configured to be coupled to the outer housing;
  a support pin configured to be coupled to the outer bushing and having a proximal end and a distal end that includes a bearing, the support pin selectively movable relative to the outer bushing when coupled thereto through rotation of the support pin relative to the outer bushing,
  wherein the bearing of the support pin is configured to contact the internal rotatable member to support the internal rotatable member relative to the outer housing, and to allow the internal rotatable member to rotate within the outer housing while being supported by the jacking tool.

2. The jacking tool of claim 1, wherein the outer bushing includes external threads for threadably coupling to the outer housing of the wind turbine component.

3. The jacking tool of claim 2, wherein the outer bushing further comprises:
   a collar at a proximal end of the outer bushing; and
   a shaft extending away from the collar and defining a distal end of the outer bushing,
   wherein the external threads extend along at least a portion of the length of the shaft.

4. The jacking tool of claim 1, wherein the passageway of the outer bushing includes internal threads and the support pin includes external threads for threadably coupling the support pin to the outer bushing.

5. The jacking tool of claim 4, wherein the proximal end of the support pin includes a tool interface for coupling to a tool configured to rotate the support pin.

6. The jacking tool of claim 1, wherein the support pin is rotatably supported within the outer bushing by one or more bearings.

7. The jacking tool of claim 1, wherein the support pin includes a hydraulic actuator having a selectively extendable and retractable arm, the bearing being positioned on a distal end of the arm.

8. The jacking tool of claim 1, wherein the bearing includes one of a cylindrical roller, a spherical ball or a spherical roller.

9. A system, comprising:
   a wind turbine component having an outer housing and an internal rotatable member disposed in the outer housing and rotatable about a rotational axis, the outer housing having at least two ports configured to provide access to an interior of the outer housing adjacent the internal rotatable member; and
   a jacking system including at least two jacking tools, wherein each of the at least two jacking tools comprises a support pin coupled to the outer housing and having a proximal end and a distal end that includes a bearing, the support pin selectively movable relative to the outer housing when coupled thereto,
   wherein the bearing of the support pin of the at least two jacking tools contacts the internal rotatable member to support the internal rotatable member relative to the outer housing, and to allow the internal rotatable member to rotate within the outer housing while being supported by the at least two jacking tools.

10. The system of claim 9, wherein each of the at least two jacking tools further comprises an outer bushing having a passageway extending through the outer bushing that receives the support pin therein, the outer bushing coupled to the outer housing.

11. The system of claim 9, wherein the at least two ports are positioned in the outer housing such that the at least two jacking tools support a lower portion of the internal rotatable member.

12. The system of claim 9, wherein the at least two ports and the at least two jacking tools are arranged into a first group of ports and jacking tools at a first longitudinal position on the internal rotatable member and a second group of ports and jacking tools at a second longitudinal position on the internal rotatable member.

13. The system of claim 9, wherein the wind turbine component includes a main bearing support.

14. The system of claim 9, wherein the wind turbine component includes a gearbox or a portion of a gearbox.

15. The system of claim 9, wherein the wind turbine component includes a generator.

16. A wind turbine, comprising:
   a nacelle provided on the top of a tower;
   a rotor including a hub and a number of blades, said rotor being supported on said nacelle, and
   a system according to claim 9.

17. A method of performing maintenance on a wind turbine component, the wind turbine component having an outer housing and an internal rotatable member disposed in the outer housing and rotatable about a rotational axis, the method comprising:
   providing at least two jacking tools, each jacking tool including a support pin configured to be selectively movable relative to the outer housing, the support pin having a proximal end and a distal end that includes a bearing;
   securing the at least two jacking tools adjacent to respective ports in the outer housing of the wind turbine; and
   moving the support pin of each jacking tool relative to the outer housing so that the bearing engages against the internal rotatable member disposed within the outer housing of the wind turbine component, wherein the at least two jacking tools support the position of the internal rotatable member relative to the outer housing so as to maintain the position of the rotational axis during maintenance.

18. The method of claim 17, wherein securing the at least two jacking tools further comprises threadably connecting each jacking tool to the respective ports in the outer housing.

19. The method of claim 18, wherein securing the at least two jacking tools further comprises connecting each jacking tool to a respective support stanchion on the outer housing.

20. The method of claim 18, wherein moving the support pin of each jacking tool further comprises actuating a hydraulic actuator so that the bearing engages against the internal rotatable member.

21. The method of claim 18, further comprising rotating the internal rotatable member while being supported by the at least two jacking tools.

22. The method of claim 18, wherein the bearing includes a roller rotatable about a rotational axis, the method further comprising orienting the bearing relative to the internal rotatable member so that the rotational axis of the roller is generally parallel to the rotational axis of the internal rotatable member.

23. The method of claim 22, further comprising adjusting the radial position of the at least two jacking tools relative to the outer housing to orient the bearing relative to the internal rotatable member.

24. The method of claim 17, wherein the at least two jacking tools further include an outer bushing configured to receive the support pin therein, and wherein securing the at least two jacking tools further comprises threadably connecting the outer bushing of each jacking tool to the respective ports in the outer housing.

25. The method of claim 24, wherein the support pin is threadably connected to the outer bushing, and wherein moving the support pin of each jacking tool further comprises rotating the support pin of each jacking tool so that the bearing engages against the internal rotatable member.

26. The method of claim 24, wherein the support pin is rotatably supported within the outer bushing by one or more bearings, and wherein moving the support pin of each jacking tool further comprises rotating the outer bushing of each jacking tool so that the bearing engages against the internal rotatable member.

* * * * *